United States Patent
Krishna et al.

(10) Patent No.: US 9,643,558 B2
(45) Date of Patent: May 9, 2017

(54) INPUT SIGNAL MISMATCH DETECTION CIRCUIT

(71) Applicants: Siddhartha Gopal Krishna, New Delhi (IN); Russell J. Lynch, West Bloomfield, MI (US); Vikram Varma, Noida (IN)

(72) Inventors: Siddhartha Gopal Krishna, New Delhi (IN); Russell J. Lynch, West Bloomfield, MI (US); Vikram Varma, Noida (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 347 days.

(21) Appl. No.: 14/624,591

(22) Filed: Feb. 18, 2015

(65) Prior Publication Data
US 2016/0236637 A1    Aug. 18, 2016

(51) Int. Cl.
*B60R 21/013* (2006.01)
*H03K 17/94* (2006.01)
(Continued)

(52) U.S. Cl.
CPC .... *B60R 21/01336* (2014.12); *B60R 21/0173* (2013.01); *B60R 2021/01129* (2013.01);
(Continued)

(58) Field of Classification Search
CPC .......... B60R 21/0132; B60R 21/01336; B60R 2021/01027; B60R 2021/01322;
(Continued)

(56) References Cited

U.S. PATENT DOCUMENTS

| 5,787,377 A | 7/1998 | Watanabe |
| 5,952,806 A * | 9/1999 | Muramatsu ............. G10C 3/20 318/568.1 |

(Continued)

FOREIGN PATENT DOCUMENTS

| EP | 1433185 B1 | 11/2007 |
| EP | 1456720 B1 | 11/2007 |

OTHER PUBLICATIONS

Mathieu Grenier, et al. Configuring the communication on FlexRay—the case of the static segment (ERTS 2008).*
(Continued)

*Primary Examiner* — Jerrah Edwards
*Assistant Examiner* — Charles J Han
(74) *Attorney, Agent, or Firm* — Charles E. Bergere

(57) ABSTRACT

A system for detecting a mismatch between first and second input signals includes first and second analog-to-digital converters, a time-division multiplexing circuit, first and second processors, a time-division de-multiplexing circuit, and a gating circuit. The first processor includes a first sinc filter, a first trimmer, a first infinite impulse response (IIR) filter, and a first high pass filter (HPF). The second processor includes a second sinc filter, a second IIR filter, and a second HPF. A bandwidth of the second IIR filter and the second HPF is greater than a bandwidth of the first IIR filter and the first HPF. A transfer function of the first IIR filter and the first HPF uses floating-point coefficients and a transfer function of the second IIR filter and the second HPF uses coefficients that are an integral power of two.

6 Claims, 8 Drawing Sheets

(51) Int. Cl.
*G06F 11/16* (2006.01)
*B60R 21/0132* (2006.01)
*B60R 21/017* (2006.01)
*B60R 21/01* (2006.01)

(52) U.S. Cl.
CPC ............... *B60R 2021/01177* (2013.01); *B60R 2021/01286* (2013.01)

(58) Field of Classification Search
CPC ... B60R 2021/0006; B60R 2021/01122; B60R 2021/01311; B60R 2021/01315; B60R 2021/013; B60R 2021/0133; B60R 2021/0136; B60R 2021/01544; B60R 2021/01548; B60R 2021/01558; B60R 2021/017; B60R 2021/0173; G06F 11/1641; G06F 11/165; G06F 11/1629; G06F 11/1675
See application file for complete search history.

(56) References Cited

U.S. PATENT DOCUMENTS

| | | | |
|---|---|---|---|
| 6,095,554 | A | 8/2000 | Foo |
| 7,434,835 | B2 | 10/2008 | Shimizu |
| 8,373,435 | B2 * | 2/2013 | Bogenberger ...... G06F 11/1641 326/14 |
| 8,633,828 | B2 | 1/2014 | Liberman |
| 2012/0233506 | A1 | 9/2012 | Kameda |
| 2013/0131929 | A1 | 5/2013 | Bortolin |

OTHER PUBLICATIONS

"Arbitration and Switching Between Bus Masters", Lattice Semiconductor Corporation, Feb. 2010, pp. 1-6, Reference Design RD1067.

* cited by examiner

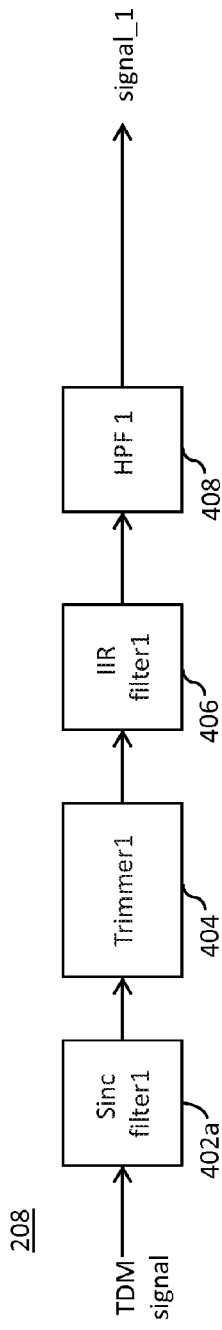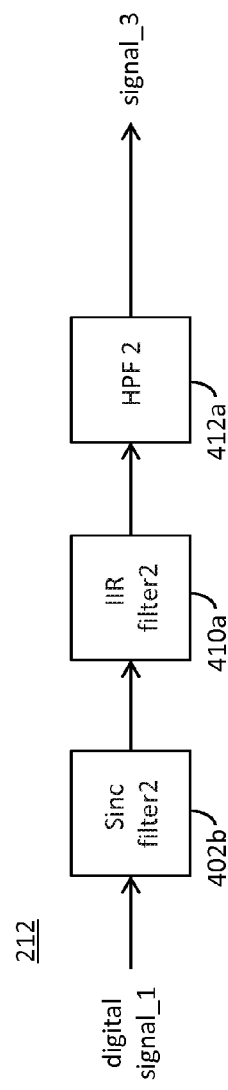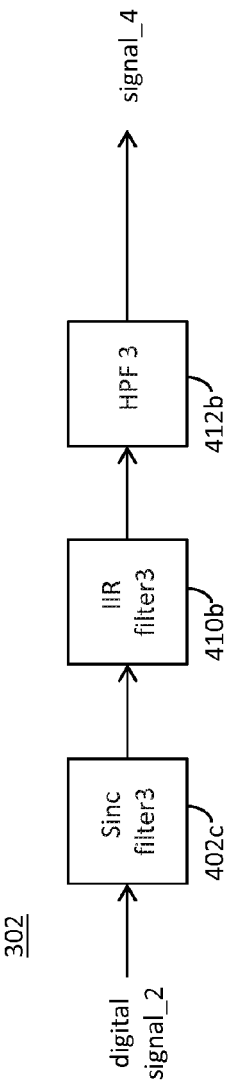
FIG. 4A
FIG. 4B
FIG. 4C

INPUT SIGNAL MISMATCH DETECTION CIRCUIT

BACKGROUND

The present invention relates generally to electronic circuits, and, more particularly, to an electronic circuit for detecting mismatch between input signals.

Electronic circuits such as microprocessors, microcontroller units (MCUs), system-on-chips (SOCs), and application specific integrated circuits (ASICs) are widely used in applications including industrial applications, automobiles, home appliances, as well as mobile and handheld devices. When an automobile crashes, a safety or restraint system in the automobile is usually employed to protect the occupants from harm, such as deploying an airbag. Such safety mechanisms are becoming increasingly important as automobiles are required to comply with various functional safety standards including NHTSA FMVSS 208 (the Federal Motor Automobile Safety Standards issued by the National Highway Traffic Safety Administration) and ISO26262 (a Functional Safety standard by the International Standards Organization, titled "Road Automobiles—Functional safety").

Engine control units (ECUs) are used to monitor and control critical functions of the automobiles including deployment of airbags based on multiple sensor outputs, e.g., impact detection sensors. FIG. 1 shows a conventional dual-channel impact detection system 100 used for deploying airbags. The impact detection system 100 includes first and second sensors 102a and 102b, first and second analog-to-digital converters (ADCs) 104a and 104b, first and second processors 106a and 106b, and an ECU 108. The first processor 106a includes a first sinc filter 110a, a first trimmer 112a, a first infinite impulse response (IIR) filter 114a, and a first high pass filter (HPF) 116a. The second processor 106b includes a second sinc filter 110b, a second trimmer 112b, a second IIR filter 114b, and a second HPF 116b.

The first and second sensors 102a and 102b may be mounted at various places of the automobile, such as the front or sides, and in the ECU at the center of gravity of the automobile to sense a frontal impact, a side impact, or a vehicle roll-over. The sensors used for crash detection typically are acceleration, gyroscopic and/or pressure sensors. In the impact detection system 100, the first and second sensors 102a and 102b are acceleration sensors that generate respective first and second output signals upon detection of a crash.

The first and second ADCs 104a and 104b, which may be sigma-delta ADCs, receive the first and second output signals and generate first and second digital signals. The first and second processors 106a and 106b receive the first and second digital signals. More particularly, the first and second sinc filters 110a and 110b, which may be linear phase finite impulse response (FIR) filters or a cascaded structure of integrators and differentiators, receive the first and second digital signals, and pass low frequency components of these signals, decimate these signals, and generate first and second sinc output signals.

The first and second trimmers 112a and 112b receive the first and second sinc output signals. The first and second trimmers 112a and 112b include multipliers and adders for compensating gain, DC offset, and non-linearity errors that may be introduced by the sensors 102a and 102b and the ADCs 104a and 104b, and generate first and second trim output signals.

The first and second IIR filters 114a and 114b receive the first and second trim output signals and pass low frequency components of these signals. The first and second IIR filters 114a and 114b include multipliers, adders, and memory elements for performing the filtering operation on the trim output signals. The first and second IIR filters 114a and 114b then generate first and second filter output signals. The first and second HPFs 116a and 116b receive the first and second filter output signals and pass high frequency components of these signals and generate first and second processed output signals. The first and second processed output signals are indicative of the instantaneous change of acceleration of the automobile detected by the first and second sensors 102a and 102b.

The ECU 108 is connected to the first and second HPFs 116a and 116b for receiving the processed output signals. The ECU 108 uses the processed output signals to run pre-stored impact detection algorithms to determine if deployment of airbags is necessary.

Generally, the first and second trimmers 112a and 112b are implemented using multipliers, adders, and intermediate registers. The first and second IIR filters 114a and 114b and the first and second HPFs 116a and 116b are implemented using memory elements, adders, multipliers, and intermediate registers. Multipliers are an expensive component and require a large circuit area. The intermediate registers used to store intermediate multiplication results also use up circuit area.

It would be advantageous to have a system for detecting a mismatch between input signals that consumes less chip area.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

FIGS. 4A, 4B, and 4C are schematic block diagrams of first, second, and third processors, respectively, in accordance with an embodiment of the present invention;

DETAILED DESCRIPTION

Figure 1:
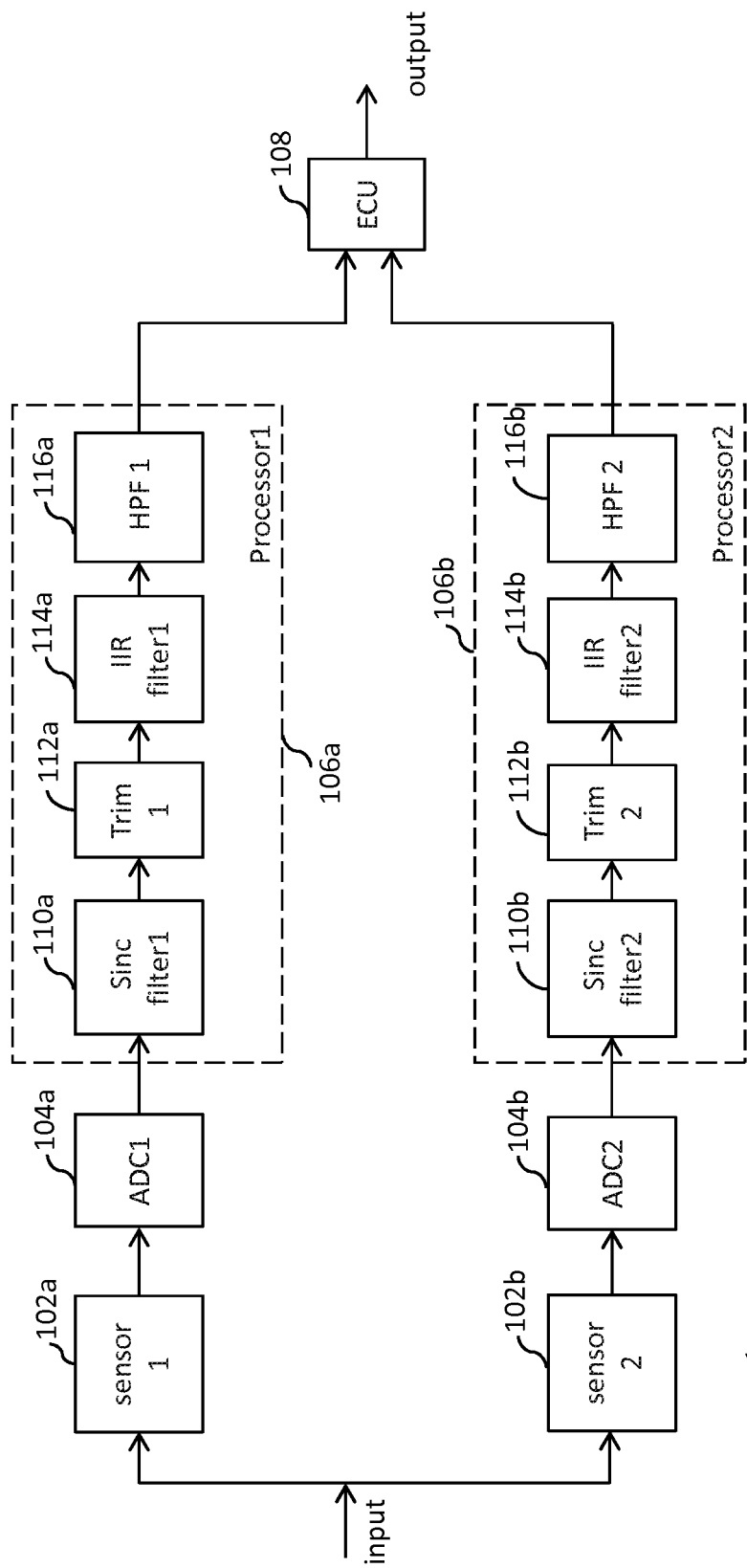
FIG. 1 is a schematic block diagram of a conventional impact detection system.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a system for detecting a mismatch between first and second input signals is provided. The system includes first and second analog-to-digital converters (ADCs), a time-division multiplexing (TDM) circuit, a first processor, a time-division de-multiplexing (TDDM) circuit, a second processor, and a gating circuit. The first ADC receives the first input signal and generates a first digital output signal. The second ADC receives the second input signal and generates a second digital output signal. The TDM circuit receives and time-division multiplexes the first and second digital output signals and outputs a TDM signal. The first processor receives the TDM signal and generates a processed output signal. The TDDM circuit receives and time-division de-multiplexes the processed output signal and outputs first and second TDDM signals. The second processor receives the first digital output signal and generates a third processed output signal. The gating circuit receives the first and second TDDM signals and the third processed output signal, compares the first and second TDDM signals with the third processed output signal, and generates first and second gating output signals, respectively, where logic states of the first and second gating output signals indicate a mismatch between the first and second input signals.

In another embodiment of the present invention, an event detection system is provided. The event detection system includes first and second sensors, first and second ADCs, a TDM circuit, a first processor, a TDDM circuit, a second processor, a gating circuit, and an ECU. The first and second sensors detect sudden changes in acceleration of a body, such as an automobile, and generate first and second output signals, respectively. The first and second ADCs receive the first and second output signals and generate first and second digital output signals, respectively. The TDM circuit receives and time-division multiplexes the first and second digital output signals and outputs a TDM signal. The first processor receives the TDM signal and generates a processed output signal. The TDDM circuit receives and time-division de-multiplexes the processed output signal and outputs first and second TDDM signals. The second processor receives the first digital output signal and generates a third processed output signal. The gating circuit receives the first and second TDDM signals and the third processed output signal, compares the first and second TDDM signals with the third processed output signal, and generates first and second gating output signals, respectively. The ECU receives the first and second gating output signals and runs pre-stored event detection algorithms using the first and second gating output signals. The pre-stored algorithms are used to generate a trigger signal that can be used, for example, for deployment of airbags.

Various embodiments of the present invention provide a system for detecting a mismatch between first and second input signals. The system includes first and second ADCs, a TDM circuit, a first processor, a TDDM circuit, a second processor, and a gating circuit. The first ADC receives the first input signal and generates a first digital output signal. The second ADC receives the second input signal and generates a second digital output signal. The TDM circuit receives and time-division multiplexes the first and second digital output signals and outputs a TDM signal. The first processor receives the TDM signal and generates a processed output signal. The TDDM circuit receives and time-division de-multiplexes the processed output signal and outputs first and second TDDM signals.

The second processor receives the first digital output signal and generates a third processed output signal. The gating circuit receives the first and second TDDM signals and the third processed output signal, compares the first and second TDDM signals with the third processed output signal, and generates first and second gating output signals, respectively, where logic states of the first and second gating output signals indicate a mismatch between the first and second input signals.

The system multiplexes the first and second digital output signals using the TDM circuit. The second processor is implemented using shifters that require less chip area than multipliers and intermediate registers used in the first processor, thereby reducing the circuit area and cost of the system. In the present invention, the first processor may be a digital signal processor (DSP) having a single multiplier. The multiplication operations performed while processing the input signals are done with time-division multiplexing, and all of the results of these sequential operations are stored in intermediate registers. In the conventional system, at least two such DSP paths are used, i.e., 2 multipliers and twice the number of intermediate registers.

The first processor includes a first sinc filter, a first trimmer, a first infinite impulse response (IIR) filter, and a first high pass filter (HPF). The second processor includes a second sinc filter, a second IIR filter, and a second HPF. The second processor is a coarse processor that is implemented without a trimmer and hence consumes less circuit area. Further, transfer functions of the first IIR filter and the first HPF comprise floating-point coefficients, while transfer functions of the second IIR filter and the second HPF comprise coefficients that are an integral power of two. Therefore, the second IIR filter and the second HPF may be implemented using shifters, as compared to the first IIR filter and the first HPF that are implemented using multipliers. Thus, the area and cost of implementing the second processor is reduced.

Figure 2:
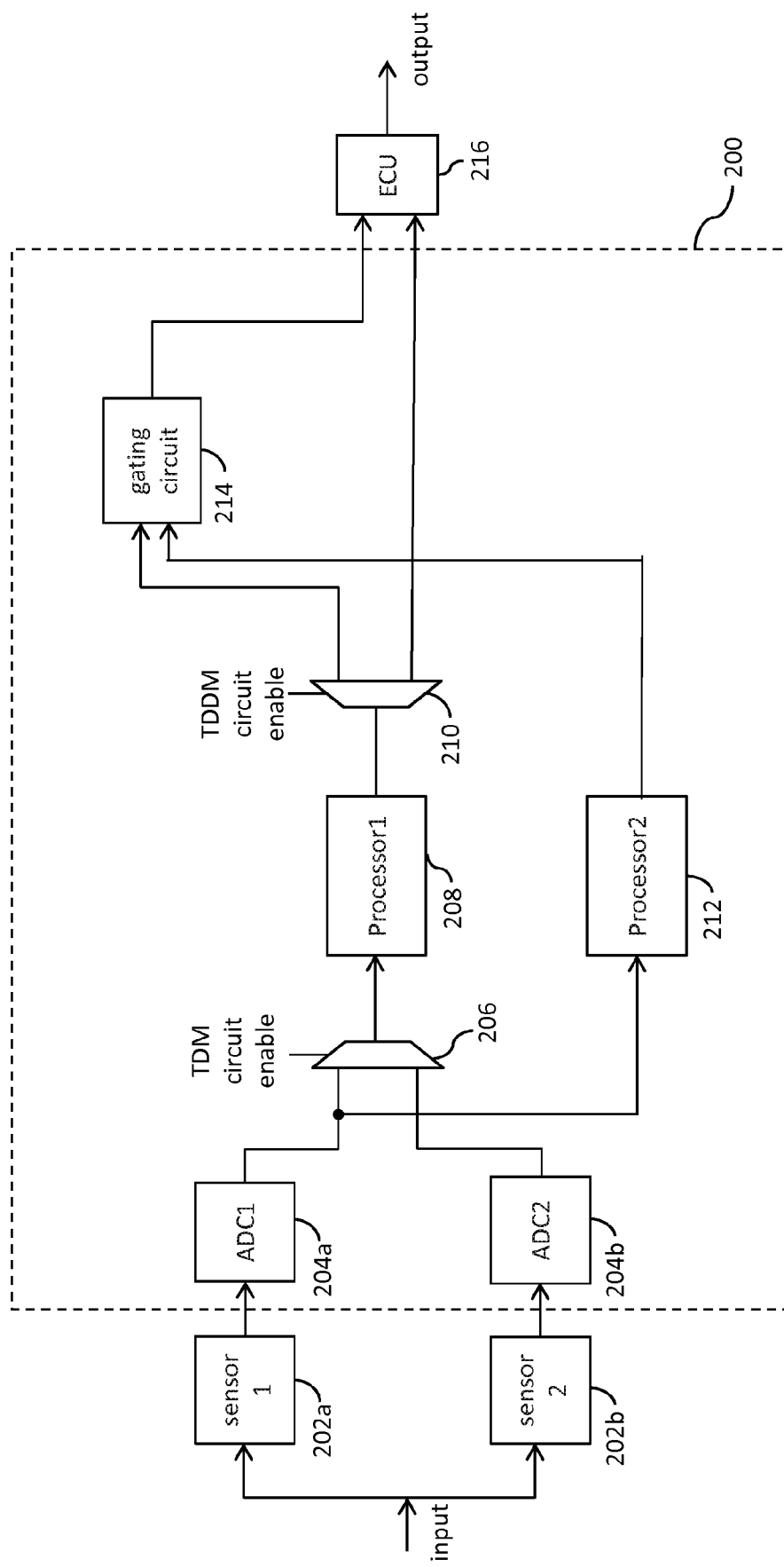
FIG. 2 is a schematic block diagram of an event detection system in accordance with an embodiment of the present invention.

Referring now to FIG. 2, a schematic block diagram of a system 200 for detecting a mismatch between input signals in accordance with an embodiment of the present invention is shown. The system 200 may be used for detecting an impact (e.g., crash) and generating a trigger signal that may be used, for example, for deploying airbags in an automobile. The system 200 is connected to first and second sensors 202a and 202b and includes first and second ADCs 204a and 204b, a TDM circuit 206, a first processor 208, a TDDM circuit 210, a second processor 212, and a gating circuit 214. The system 200 is connected to an ECU 216.

The first and second sensors 202a and 202b may be accelerometers that detect changes in velocity and output first and second output signals (i.e., first and second sensor data), respectively.

The first and second ADCs 204a and 204b are connected to the first and second sensors 202a and 202b, respectively, for receiving the first and second output signals, respectively, and generating first and second digital output signals, respectively. As known by those of skill in the art, sensors like the sensors 202a, 202b, and ADCs introduce gain, DC offset, and non-linearity errors into the first and second digital output signals, respectively.

The TDM circuit 206 is connected to the first and second ADCs 204a and 204b for receiving the first and second digital output signals, respectively. The TDM circuit 206 time-division multiplexes the first and second digital output signals and generates a TDM signal.

The first processor 208, which may be a DSP, is connected to the TDM circuit 206 for receiving the TDM signal. The first processor 208 filters the TDM signal for achieving a desired bandwidth for processing, trims the filtered TDM signal for compensating for the gain, DC offset, and non-linearity errors, and generates a first processed output signal. The first processed output signal is then input to the TDDM circuit 210.

The TDDM circuit 210 is connected to the first processor 208 and receives the first processed output signal. The TDDM circuit 210 time-division de-multiplexes the first processed output signal and generates respective first and second TDDM signals on its first and second output lines.

The second processor 212 is connected to the first ADC 204a for receiving the first digital output signal. Like the first processor, the second processor 212 is a digital signal processor (DSP) that performs low-pass and high-pass filtering of the first digital output signal and generates a second processed output signal. It will be apparent to a person skilled in the art that the second processor 212 may be connected to the second ADC 204b for receiving the second digital output signal and generating the second processed output signal from the second digital output signal.

The gating circuit 214 is connected to the TDDM circuit 210 for receiving the first TDDM signal, and to the second processor 212 for receiving the second processed output signal. The gating circuit 214 compares the first TDDM signal with the second processed output signal. If the first TDDM signal and the second processed output signal match, then the gating circuit 214 generates a first gating output signal indicative of the first sensor data and transmits the first gating output signal to the ECU 216. If the first TDDM signal and the second processed output signal do not match, then the gating circuit 214 gates the first sensor data (i.e., the first TDDM signal). Thus, if an error is detected, the first output of the TDDM circuit 210 is gated. The second output line of the TDDM circuit 210, upon which the second TDDM signal is provided, is input directly to the ECU 216 without any gating.

The ECU 216 is connected to the gating circuit 214 and the TDDM circuit 210 for receiving the first and second sensor data (i.e., the first and second TDDM signals), respectively, when a match is detected between the first TDDM signal and the second processed output signal. The ECU 216 uses the first and second gating output signals to run pre-stored event detection algorithms to determine if a trigger signal should be generated (e.g., for deployment of airbags).

Figure 3:
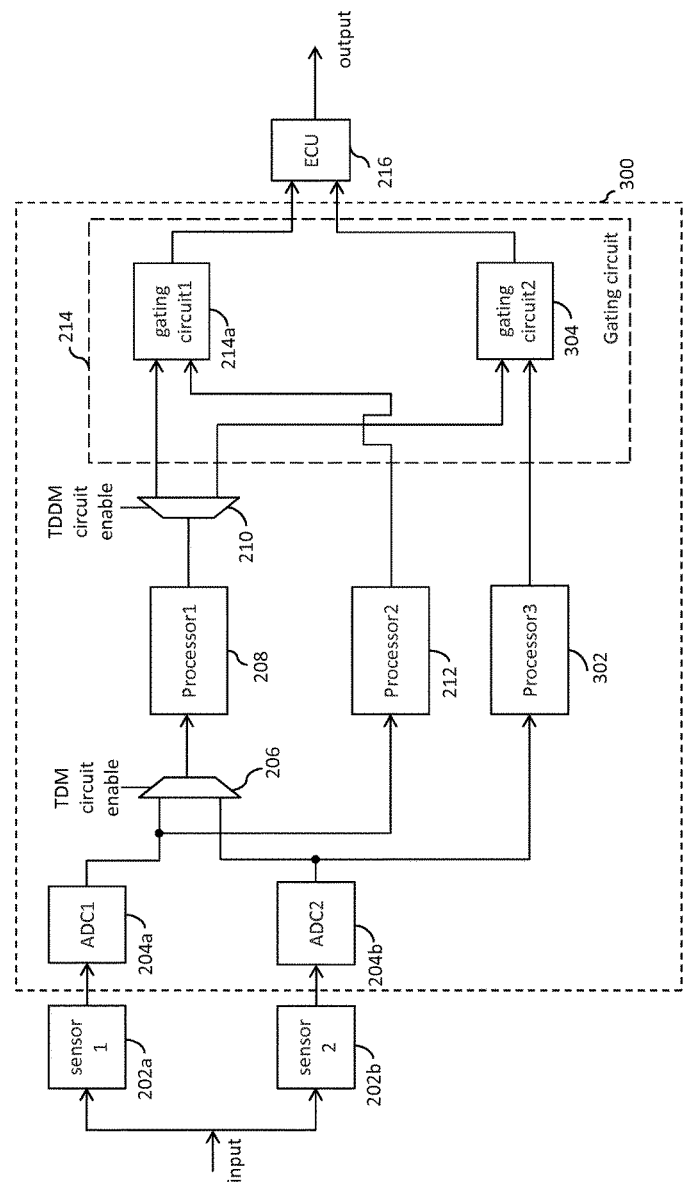
FIG. 3 is a schematic block diagram of an event detection system in accordance with another embodiment of the present invention.

Referring now to FIG. 3, a schematic block diagram of an event detection system 300 for detecting a mismatch between input signals in accordance with another embodiment of the present invention is shown. The event detection system 300 is connected to the first and second sensors 202a and 202b and includes the first and second ADCs 204a and 204b, the TDM circuit 206, the first processor 208, the TDDM circuit 210, the second processor 212, the gating circuit 214, and a third processor 302. The gating circuit 214 includes a first gating circuit 214a and a second gating circuit 304. The event detection system 300 is connected to the ECU 216. The operation of the first and second sensors 202a and 202b, the first and second ADCs 204a and 204b, the TDM circuit 206, the first and second processors 208 and 212, the TDDM circuit 210, the gating circuit 214, and the ECU 216 are generally the same as explained above with reference to FIG. 2.

The third processor 302 is connected to the second ADC 204b for receiving the second digital output signal. The third processor 302 is functionally and structurally similar to the second processor 212 and performs low-pass and high-pass filtering on the second digital output signal and generates a third processed output signal.

The second gating circuit 304 is connected to the TDDM circuit 210 and the third processor 302 for receiving the second TDDM signal and the third processed output signal, respectively. The second gating circuit 304 compares the second TDDM signal with the third processed output signal. If the second TDDM signal and the third processed output signal match, then the second gating circuit 304 generates a second gating output signal indicative of the second sensor data and transmits the second gating output signal to the ECU 216. If the second TDDM signal and the third processed output signal do not match, then the second gating circuit 304 gates the second sensor data. In an embodiment of the present invention, the first and second gating circuits 214a and 304 comprise logic AND gates.

The ECU 216 is connected to the first and second gating circuits 214a and 304. The ECU 216 receives the first and second sensor data when the match is detected between the first and second TDDM signals and the second and third processed output signals, respectively. The ECU 216 uses the first and second gating output signals to run pre-stored event detection algorithms to determine if generation of a trigger signal is necessary (e.g., for deployment of airbags).

FIGS. 4A-4C are schematic block diagrams of the first, second, and third processors 208, 212, and 302. The first processor 208 includes a first sinc filter 402a, a first trimmer 404, a first infinite impulse response (IIR) filter 406, and a first high pass filter (HPF) 408.

The first sinc filter 402a is connected to the TDM circuit 206 for receiving the first TDM signal. The first sinc filter 402a passes low frequency components of the first TDM signal, decimates the first TDM signal, and generates a first sinc output signal. Subsequently, the first sinc filter 402a receives the second TDM signal and generates a second sinc output signal in the same manner.

The first trimmer 404 is connected to the first sinc filter 402a for receiving the first sinc output signal. The first trimmer 404 compensates for the gain, DC offset, and non-linearity errors introduced by the first sensor 202a and the first ADC 204a and generates a first trim output signal. Subsequently, the first trimmer 404 receives the second sinc output signal and generates a second trim output signal.

The first IIR filter 406 is connected to the first trimmer 404 for receiving the first trim output signal. The first IIR filter 406 passes low frequency components of the first trim output signal and generates a first filter output signal. A cut-off frequency of the first IIR filter 406 is lower than a cut-off frequency of the first sinc filter 402a. In one embodiment, the cut-off frequency of the first IIR filter 406 may be 1 kilohertz (kHz) and the cut-off frequency of the first sinc filter 402a may be 100 kHz. Subsequently, the first IIR filter 406 receives the second trim output signal and generates a second filter output signal.

The first HPF 408 is connected to the first IIR filter 406 for receiving the first filter output signal. The first HPF 408 passes high frequency components of the first filter output signal and generates the first processed output signal (also referred to as "signal_1"). Subsequently, the first HPF 408 receives the second filter output signal and generates the second processed output signal.

The second processor 212 includes a second sinc filter 402b, a second IIR filter 410a, and a second HPF 412a. The second sinc filter 402b is connected to the first ADC 204a for receiving the first digital output signal (also referred to as "digital signal_1"). The second sinc filter 402b is functionally and structurally similar to the first sinc filter 402a. Thus, the second sinc filter 402b filters and decimates the first digital output signal and generates a third sinc output signal.

The second IIR filter 410a is connected to the second sinc filter 402b for receiving the third sinc output signal. The second IIR filter 410a passes low frequency components of the third sinc output signal and generates a third filter output signal. A cut-off frequency of the second IIR filter 410a is lower than a cut-off frequency of the second sinc filter 402b. For example, the cut-off frequency of the second IIR filter 410a may be 4 kHz and the cut-off frequency of the second sinc filter 402b may be 100 kHz. A bandwidth of the second IIR filter 410a is greater than a bandwidth of the first IIR filter 406. In one embodiment, the bandwidth of the second IIR filter 410a is 4 kHz and the bandwidth of the first IIR filter 406 is 1 kHz.

The second HPF 412a is connected to the second IIR filter 410a for receiving the third filter output signal. The second HPF 412a passes high frequency components of the third filter output signal and generates the third processed output signal (also referred to as "signal_3"). A bandwidth of the second HPF 412a is greater than a bandwidth of the first HPF 408. For example, the bandwidth of the second HPF 412a may be 4 Hz and the bandwidth of the first HPF 408 may be 1 Hz.

The third processor 302 includes a third sinc filter 402c, a third IIR filter 410b, and a third HPF 412b. The third sinc filter 402c is connected to the second ADC 204b for receiving the second digital output signal (also referred to as "digital signal_2"). The third sinc filter 402c is functionally and structurally similar to the first sinc filter 402a. The third sinc filter 402c filters and decimates the second digital output signal and generates a fourth sinc output signal.

The third IIR filter 410b is connected to the third sinc filter 402c for receiving the fourth sinc output signal. The third IIR filter 410b is functionally and structurally similar to the second IIR filter 410a. The third IIR filter 410b passes low frequency components of the fourth sinc output signal and generates a fourth filter output signal. A cut-off frequency of the third IIR filter 410b is lower than a cut-off frequency of the third sinc filter 402c. In one embodiment, the cut-off frequency of the third IIR filter 410b is 4 kHz and the cut-off frequency of the third sinc filter 402c is 100 kHz. In a preferred embodiment, a bandwidth of the third IIR filter 410b is greater than a bandwidth of the first IIR filter 406. For example, the bandwidth of the third IIR filter 410b may be 4 kHz and the bandwidth of the first IIR filter 406 may be 1 kHz.

The third HPF 412b is connected to the third IIR filter 410b for receiving the fourth filter output signal. The third HPF 412b is functionally and structurally similar to the second HPF 412a. The third HPF 412b passes high frequency components of the fourth filter output signal and generates the fourth processed output signal (also referred to as "signal_4"). In a preferred embodiment, a bandwidth of the third HPF 412b is greater than a bandwidth of the first HPF 408. For example, the bandwidth of the third HPF 412b may be 4 Hz and the bandwidth of the first HPF 408 may be 1 Hz.

Figure 5A:
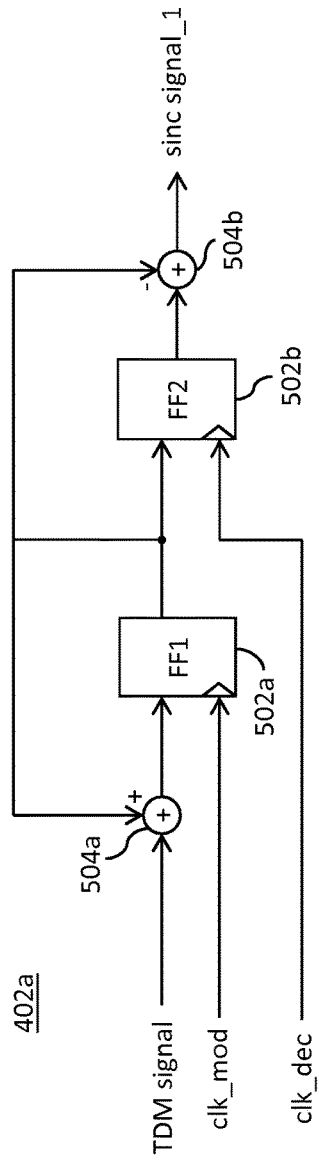
FIGS. 5A and 5B are schematic block diagrams of a first sinc filter and a first trimmer, respectively, in accordance with an embodiment of the present invention.

Referring now to FIG. 5A, a schematic block diagram of the first sinc filter 402a in accordance with an embodiment of the present invention is shown. The first sinc filter 402a includes first and second flip-flops 502a and 502b and first and second adders 504a and 504b.

A transfer function of the first sinc filter 402a is given by equation (1) below:

$$A(z) = (1-z^{-r})/(1-z^{-n}) \qquad (1)$$

where, $A(z)$=the transfer function representing the first sinc filter 402a, r=a decimation ratio, and n=an order of the first sinc filter 402a.

The order of the first sinc filter 402a is 1.

The first flip-flop 502a receives a first clock signal (also referred to as "clk_mod") from a clock modulation circuit (not shown) and a first adder output signal and generates a first flip-flop output signal. The first adder 504a is connected to the first flip-flop 502a and the TDM circuit 206 for receiving the first flip-flop output signal and the first time-division multiplexed signal, respectively, and generates the first adder output signal. The second flip-flop 502b is connected to a clock decimation circuit (not shown) and the first flip-flop 502a for receiving a second clock signal (also referred to as "clk_dec") and the first flip-flop output signal, respectively, and generates a second flip-flop output signal. The second adder 504b is connected to the first and second flip-flops 502a and 502b for receiving the first and second flip-flop output signals, respectively, and generates the first sinc output signal (also referred to as "sinc signal_1"). It will be apparent to a person skilled in the art that the order of the first sinc filter 402a may be changed by addition of one or more of the flip-flops 502. The first sinc filter 402a subsequently receives the second time-division multiplexed signal and generates the second sinc output signal. The second and third sinc filters 402b and 402c are functionally and structurally similar to the first sinc filter 402a.

Figure 5B:
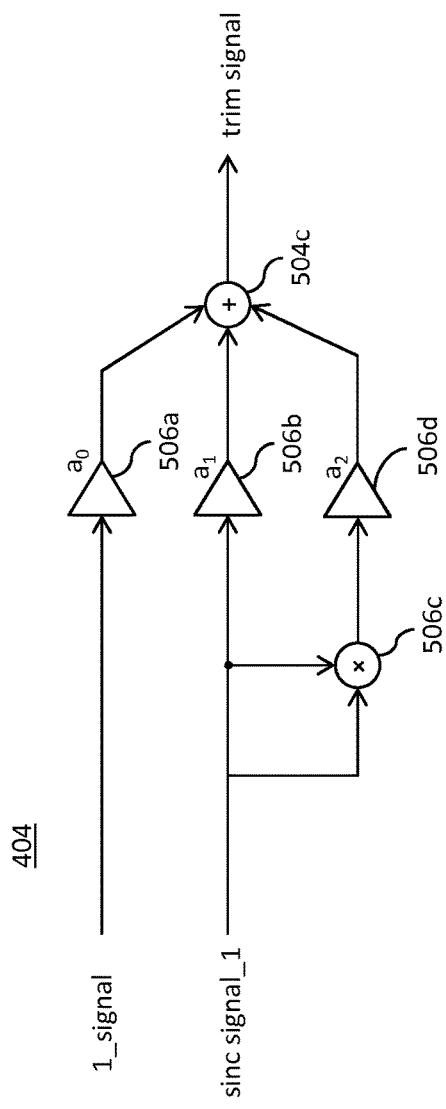

Referring now to FIG. 5B, a schematic block diagram of the first trimmer 404 in accordance with an embodiment of the present invention is shown. The first trimmer 404 includes first through fourth multipliers 506a-506d and a third adder 504c. In one embodiment, the first through fourth multipliers 506a-506d are 32-64 bit multipliers.

The first trimmer 404 generates the first trim output signal, as shown by equation (2) below:

$$t_o = a_0 + a_1 * s_o + a_2 * s_o^2 \qquad (2)$$

where, $t_o$=the first trim output signal, $a_0$, $a_1$, and $a_2$=first, second, and fourth coefficients of the first, second, and fourth multipliers, 506a, 506b, and 506d, respectively, and $s_o$=the first sinc output signal.

The first, second, and fourth coefficients $a_0$, $a_1$, and $a_2$ are floating-point coefficients.

The first multiplier 506a receives a first signal (also referred to as "1_signal"), multiplies the first signal with the first coefficient $a_0$, and generates a first multiplier output signal. The second multiplier 506b is connected to the second adder 504b for receiving the first sinc output signal, multiplies the first sinc output signal with the second coefficient $a_1$, and generates a second multiplier output signal. The third multiplier 506c is connected to the second adder 504b for receiving the first sinc output signal and generates a third multiplier output signal. The fourth multiplier 506d is connected to the third multiplier 506c for receiving the third multiplier output signal, multiplies the third multiplier output signal with the fourth coefficient $a_2$, and generates a fourth multiplier output signal. The third adder 504c is connected to the first, second, and fourth multipliers 506a, 506b, and 506d for receiving the first, second, and fourth multiplier output signals, respectively, and generates the first trim output signal (also referred to as "trim signal"). The first trimmer 404 subsequently receives the second sinc output signal and generates the second trim output signal.

The first trimmer 404 compensates for any gain, DC offset, and non-linearity errors in the first and second sinc output signals. The event detection system 300 may include one or more intermediate registers associated with the first trimmer 404 for storing data that is indicative of at least one of the first through fourth multiplier output signals. The order of the first trimmer 404 may be changed by addition or removal of one or more of the multipliers 506.

Figure 6:
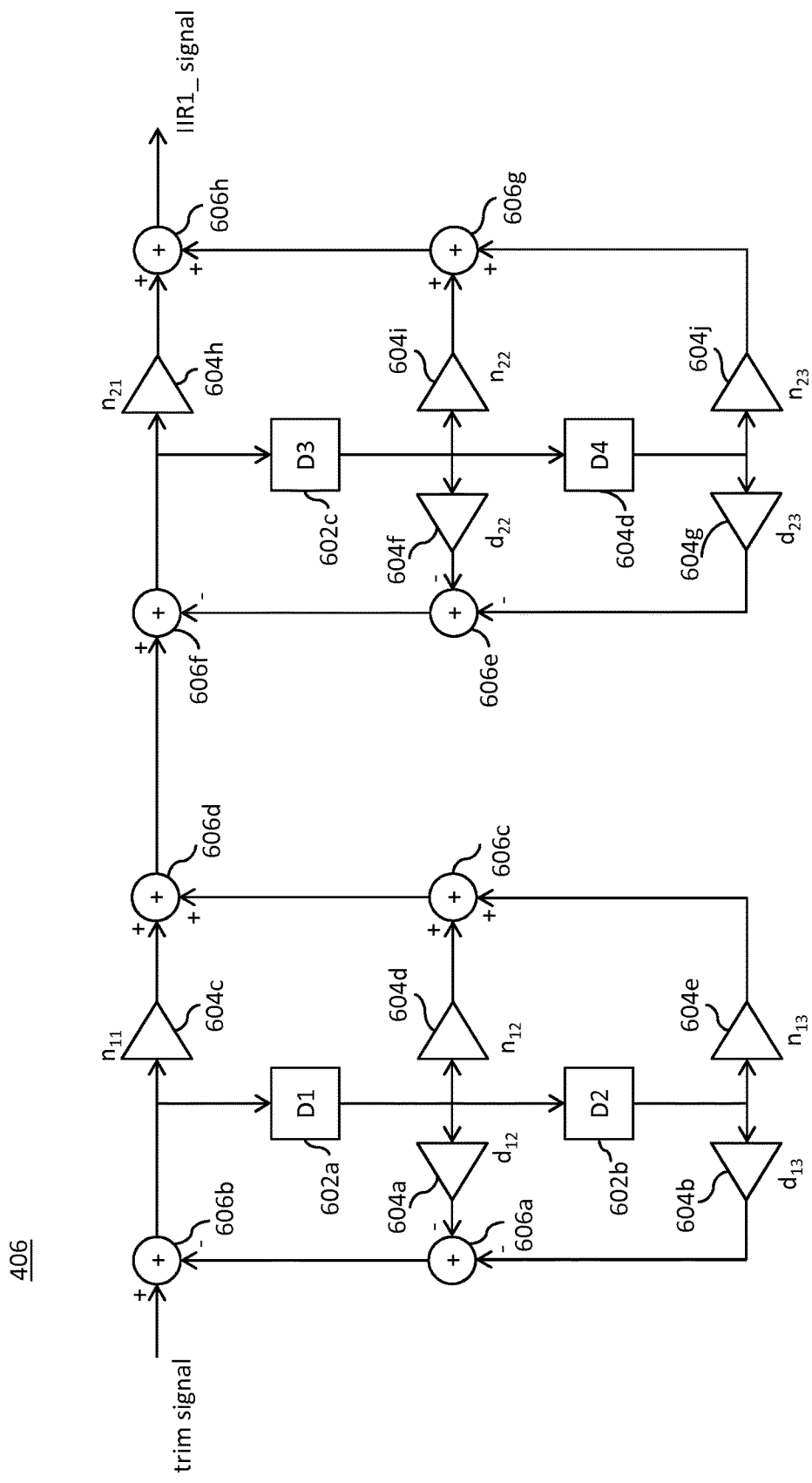
FIG. 6 is a schematic block diagram of a first infinite impulse response (IIR) filter in accordance with an embodiment of the present invention.

Referring now to FIG. 6, a schematic block diagram of the first IIR filter 406 in accordance with an embodiment of the present invention is shown. The first IIR filter 406 includes first through fourth memory elements 602a-602d, fifth through fourteenth multipliers 604a-604j, and fourth through eleventh adders 606a-606h. In an example, the fifth through fourteenth multipliers 604a-604j are 32-64 bit multipliers.

A transfer function of the first IIR filter 406 is given by equation (3) below:

$$B(z) = ((n_{11} + n_{12}*z^{-1} + n_{13}*z^{-2})*(n_{21} + n_{22}*z^{-1} + n_{23}*z^{-2})) / ((1 + d_{12}*z^{-1} + d_{13}*z^{-2})*(1 + d_{22}*z^{-1} + d_{23}*z^{-2}))$$  (3)

where,

B(z)=the transfer function representing the first IIR filter 406 and $d_{12}$, $d_{13}$, $n_{11}$, $n_{12}$, $n_{13}$, $d_{22}$, $d_{23}$, $n_{21}$, $n_{22}$, and $n_{23}$=fifth through fourteenth coefficients of the fifth through fourteenth multipliers 604a-604j, respectively.

The fifth through fourteenth coefficients $d_{12}$, $d_{13}$, $n_{11}$, $n_{12}$, $n_{13}$, $d_{22}$, $d_{23}$, $n_{21}$, $n_{22}$, and $n_{23}$ are floating-point coefficients.

The first memory element 602a receives a fifth adder output signal and generates a first delay output signal. The fifth multiplier 604a is connected to the first memory element 602a for receiving the first delay output signal, multiplies the first delay output signal with the fifth coefficient $d_{12}$, and generates a fifth multiplier output signal. The second memory element 602b is connected to the first memory element 602a for receiving the first delay output signal and generates a second delay output signal. The sixth multiplier 604b is connected to the second memory element 602b for receiving the second delay output signal, multiplies the second delay output signal with the sixth coefficient $d_{13}$, and generates a sixth multiplier output signal. The fourth adder 606a is connected to the fifth and sixth multipliers 604a and 604b for receiving the fifth and sixth multiplier output signals, respectively, and generates a fourth adder output signal. The fifth adder 606b is connected to the third and fourth adders 504c and 606a for receiving the first trim and fourth adder output signals, respectively, and generates the fifth adder output signal.

The seventh multiplier 604c is connected to the fifth adder 606b for receiving the fifth adder output signal, multiplies the fifth adder output signal with the seventh coefficient $n_{11}$, and generates a seventh multiplier output signal. The eighth multiplier 604d is connected to the first memory element 602a for receiving the first delay output signal, multiplies the first delay output signal with the eighth coefficient $n_{12}$, and generates an eighth multiplier output signal. The ninth multiplier 604e is connected to the second memory element 602b for receiving the second delay output signal, multiplies the second delay output signal with the ninth coefficient $n_{13}$, and generates a ninth multiplier output signal. The sixth adder 606c is connected to the eighth and ninth multipliers 604d and 604e for receiving the eighth and ninth multiplier output signals, respectively, and generates a sixth adder output signal. The seventh adder 606d is connected to the seventh multiplier 604c and the sixth adder 606c for receiving the seventh multiplier and sixth adder output signals, respectively, and generates the seventh adder output signal.

The third memory element 602c receives a ninth adder output signal and generates a third delay output signal. The tenth multiplier 604f is connected to the third memory element 602c for receiving the third delay output signal, multiplies the third delay output signal with the tenth coefficient $d_{22}$, and generates a tenth multiplier output signal. The fourth memory element 602d is connected to the third memory element 602c for receiving the third delay output signal and generates a fourth delay output signal. The eleventh multiplier 604g is connected to the fourth memory element 602d for receiving the fourth delay output signal, multiplies the fourth delay output signal with the eleventh coefficient $d_{22}$, and generates an eleventh multiplier output signal. The eighth adder 606e is connected to the tenth and eleventh multipliers 604f and 604g for receiving the tenth and eleventh multiplier output signals, respectively, and generates an eighth adder output signal. The ninth adder 606f is connected to the seventh and eighth adders 606d and 606e for receiving the seventh and eighth adder output signals, respectively, and generates the ninth adder output signal.

The twelfth multiplier 604h is connected to the ninth adder 606f for receiving the ninth adder output signal, multiplies the ninth adder output signal with the twelfth coefficient $n_{21}$, and generates a twelfth multiplier output signal. The thirteenth multiplier 604i is connected to the third memory element 602c for receiving the third delay output signal, multiplies the third delay output signal with the thirteenth coefficient $n_{22}$, and generates a thirteenth multiplier output signal. The fourteenth multiplier 604j is connected to the fourth memory element 602d for receiving the fourth delay output signal, multiplies the fourth delay output signal with the fourteenth coefficient $n_{23}$, and generates a fourteenth multiplier output signal. The tenth adder 606g is connected to the thirteenth and fourteenth multipliers 604i and 604j for receiving the thirteenth and fourteenth multiplier output signals, respectively, and generates a tenth adder output signal. The eleventh adder 606h is connected to the tenth adder and the twelfth multiplier 606g and 604h for receiving the tenth adder and twelfth multiplier output signals, respectively, and generates the first filter output signal (also referred to as "IIR1_signal").

The first IIR filter 406 subsequently receives the second trim output signal and generates the second filter output signal. Thus, the first IIR filter 406 passes low frequency components of the first and second trim output signals. For example, the event detection system 300 may include one or more intermediate registers associated with the first IIR filter 406 for storing data that is indicative of at least one of the fifth through fourteenth multiplier output signals and the fourth through tenth adder output signals. The order of the first IIR filter 406 may be changed by addition or removal of one or more of the memory elements 602.

Figure 7:
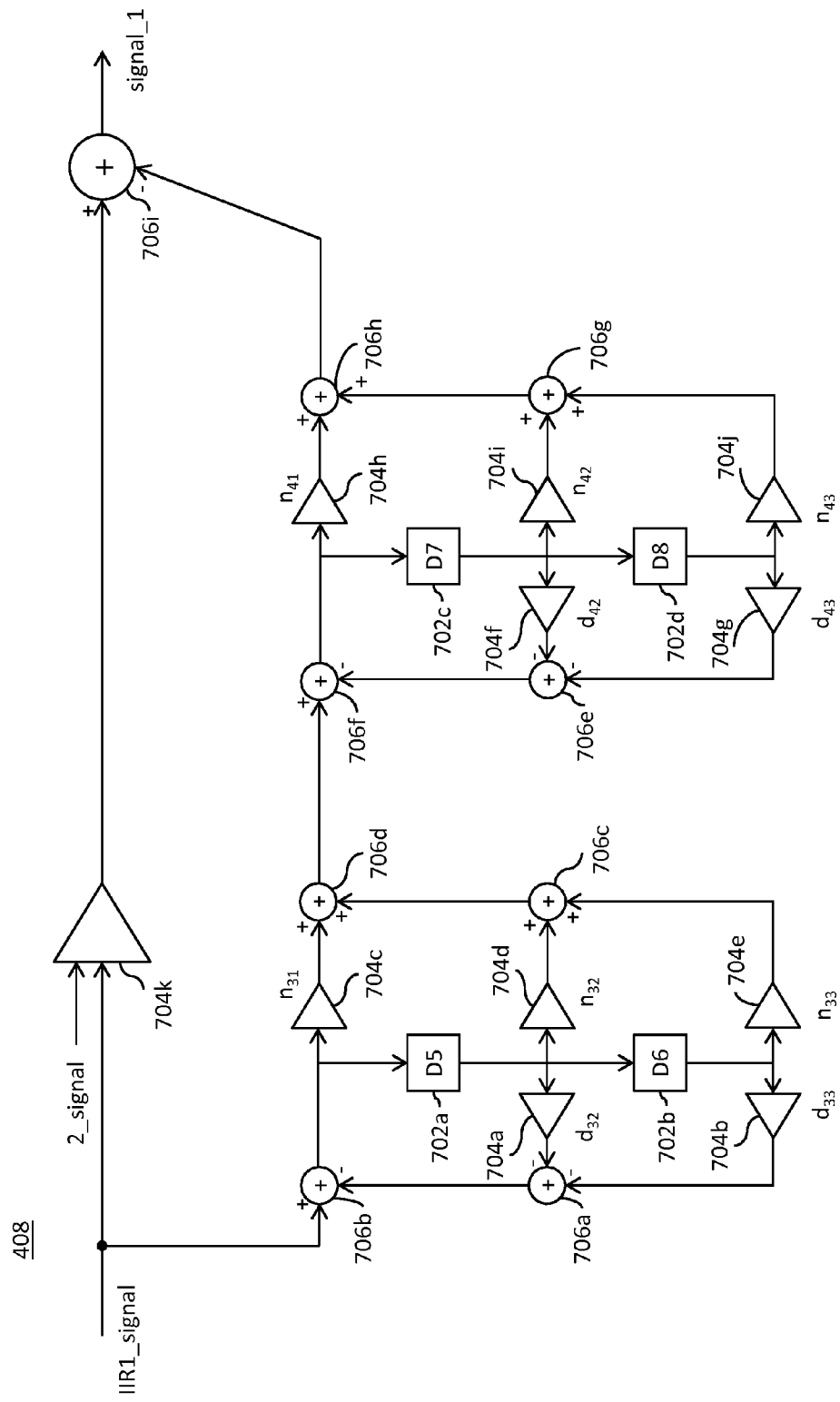
FIG. 7 is a schematic block diagram of a first high pass filter (HPF) in accordance with another embodiment of the present invention.

Referring now to FIG. 7, a schematic block diagram of the first HPF 408 in accordance with an embodiment of the present invention is shown. The first HPF 408 includes fifth through eighth memory elements 702a-702d, fifteenth through twenty-fifth multipliers 704a-704k, and twelfth through twentieth adders 706a-706i. In an example, the fifteenth through twenty-fifth multipliers 704a-704k are 32-64 bit multipliers.

A transfer function of the first HPF 408 is given by equation (4) below:

$$C(z)=1-(((n_{31}+n_{32}*z^{-1}+n_{33}*z^{-2})n_{41}+n_{42}*z^{-1}+n_{43}*z^{-2}))/((1+d_{32}*z^{-1}+d_{33}*z^{-2})*(1+d_{42}*z^{-2}+d_{43}*z^{-2}))) \quad (4)$$

where,

C(z)=the transfer function representing the first HPF 408 and $d_{32}$, $d_{33}$, $n_{31}$, $n_{32}$, $n_{33}$, $d_{42}$, $d_{43}$, $n_{41}$, $n_{42}$, and $n_{43}$=fifteenth through twenty-fourth coefficients of the fifteenth through twenty-fourth multipliers 704a-704j, respectively.

The fifteenth through twenty-fourth coefficients $d_{32}$, $d_{33}$, $n_{31}$, $n_{32}$, $n_{33}$, $d_{42}$, $d_{43}$, $n_{41}$, $n_{42}$, and $n_{43}$ are floating-point coefficients.

The fifth memory element 702a receives a thirteenth adder output signal and generates a fifth delay output signal. The fifteenth multiplier 704a is connected to the fifth memory element 702a for receiving the fifth delay output signal, multiplies the fifth delay output signal with the fifteenth coefficient $d_{32}$, and generates a fifteenth multiplier output signal. The sixth memory element 702b is connected to the fifth memory element 702a for receiving the fifth delay output signal and generates a sixth delay output signal. The sixteenth multiplier 704b is connected to the sixth memory element 702b for receiving the sixth delay output signal, multiplies the sixth delay output signal with the sixteenth coefficient $d_{33}$, and generates a sixteenth multiplier output signal. The twelfth adder 706a is connected to the fifteenth and sixteenth multipliers 704a and 704b for receiving the fifteenth and sixteenth multiplier output signals, respectively, and generates a twelfth adder output signal. The thirteenth adder 706b is connected to the eleventh and twelfth adders 606h and 706a for receiving the first filter and twelfth adder output signals, respectively, and generates the thirteenth adder output signal.

The seventeenth multiplier 704c is connected to the thirteenth adder 706b for receiving the thirteenth adder output signal, multiplies the thirteenth adder output signal with the seventeenth coefficient $n_{31}$, and generates a seventeenth multiplier output signal. The eighteenth multiplier 704d is connected to the fifth memory element 702a for receiving the fifth delay output signal, multiplies the fifth delay output signal with the eighteenth coefficient $n_{32}$, and generates an eighteenth multiplier output signal. The nineteenth multiplier 704e is connected to the sixth memory element 702b for receiving the sixth delay output signal, multiplies the sixth delay output signal with the nineteenth coefficient $n_{33}$, and generates a nineteenth multiplier output signal. The fourteenth adder 706c is connected to the eighteenth and nineteenth multipliers 704d and 704e for receiving the eighteenth and nineteenth multiplier output signals, respectively, and generates a fourteenth adder output signal. The fifteenth adder 706d is connected to the seventeenth multiplier and the fourteenth adder 704c and 706c for receiving the seventeenth multiplier and fourteenth adder output signals, respectively, and generates the fifteenth adder output signal.

The seventh memory element 702c receives a seventeenth adder output signal and generates a seventh delay output signal. The twentieth multiplier 704f is connected to the seventh memory element 702c for receiving the seventh delay output signal, multiplies the seventh delay output signal with the twentieth coefficient $d_{42}$, and generates a twentieth multiplier output signal. The eighth memory element 702d is connected to the seventh memory element 702c for receiving the seventh delay output signal and generates an eighth delay output signal. The twenty-first multiplier 704g is connected to the eighth memory element 702d for receiving the eighth delay output signal, multiplies the eighth delay output signal with the twenty-first coefficient $d_{43}$, and generates a twenty-first multiplier output signal. The sixteenth adder 706e is connected to the twentieth and twenty-first multipliers 704f and 704g for receiving the twentieth and twenty-first multiplier output signals, respectively, and generates a sixteenth adder output signal. The seventeenth adder 706f is connected to the fifteenth and sixteenth adders 706d and 706e for receiving the fifteenth and sixteenth adder output signals, respectively, and generates the seventeenth adder output signal.

The twenty-second multiplier 704h is connected to the seventeenth adder 706f for receiving the seventeenth adder output signal, multiplies the seventeenth adder output signal with the twenty-second coefficient $n_{41}$, and generates a twenty-second multiplier output signal. The twenty-third multiplier 704i is connected to the seventh memory element 702c for receiving the seventh delay output signal, multiplies the seventh delay output signal with the twenty-third coefficient $n_{42}$, and generates a twenty-third multiplier output signal. The twenty-fourth multiplier 704j is connected to the eighth memory element 702d for receiving the eighth delay output signal, multiplies the eighth delay output signal with the twenty-fourth coefficient $n_{43}$, and generates a twenty-fourth multiplier output signal. The eighteenth adder 706g is connected to the twenty-third and twenty-fourth multipliers 704i and 704j for receiving the twenty-third and twenty-fourth multiplier output signals, respectively, and generates an eighteenth adder output signal. The nineteenth adder 706h is connected to the twenty-second multiplier and the eighteenth adder 704h and 706g for receiving the twenty-second multiplier and eighteenth adder output signals, respectively, and generates the nineteenth adder output signal.

The twenty-fifth multiplier 704k is connected to the eleventh adder 606h for receiving the first filter output signal, multiplies the first filter output signal with a second signal (also referred to as "2_signal") and generates a twenty-fifth multiplier output signal. The twentieth adder 706i is connected to the twenty-fifth multiplier and the nineteenth adder 704k and 706h for receiving the twenty-fifth multiplier and nineteenth adder output signals, respectively, and generates the first processed output signal.

The first HPF 408 subsequently receives the second filter output signal and generates the second processed output signal. Thus, the first HPF 408 passes high frequency components of the first and second filter output signals. In an example, the event detection system 300 may include one or more intermediate registers associated with the first HPF 408 for storing data that is indicative of at least one of the fifteenth through twenty-fifth multiplier output signals and the twelfth through nineteenth adder output signals. The order of the first HPF 408 may be changed by addition or removal of one or more of the memory elements 702.

Figure 8A:
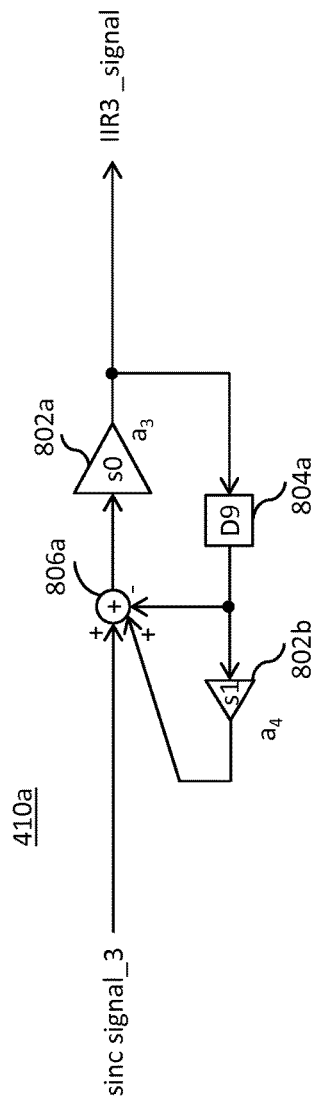
FIGS. 8A and 8B are schematic block diagrams of a second IIR filter and a second HPF, respectively, in accordance with an embodiment of the present invention.

Referring now to FIG. 8A, a schematic block diagram of the second IIR filter 410a in accordance with an embodiment of the present invention is shown. The second IIR filter 410a includes first and second shifters 802a and 802b, a ninth memory element 804a, and a twenty-first adder 806a. In an example, the first and second shifters 802a and 802b are 8-16 bit shifters.

A transfer function of the second IIR filter 410a is given by equation (5) below:

$$D(z)=a_3*(1/(1-z^{-1}+a_4*z^{-1})) \quad (5)$$

where,

D(z)=the transfer function representing the second IIR filter 410a and $a_3$ and $a_4$=first and second shifter coefficients, respectively.

Binary values of the first and second shifter coefficients $a_3$ and $a_4$ are an integral power of two. For example, the value of $a_3$ may be 1/16 ($2^{-4}$) and the value of $a_4$ may be 16 ($2^4$). The first shifter 802a performs four right shift operations for multiplying a first shifter input signal with the first shifter coefficient $a_3$. The second shifter 802b performs four left shift operations for multiplying a second shifter input signal with the second shifter coefficient $a_4$.

The first shifter 802a receives a twenty-first adder output signal (the first shifter input signal) and generates the third filter output signal (also referred to as "IIR3_signal"). The ninth memory element 804a is connected to the first shifter 802a for receiving the third filter output signal and generates a ninth delay output signal. The second shifter 802b is connected to the ninth memory element 804a for receiving the ninth delay output signal (the second shifter input signal) and generates a second shifter output signal. The twenty-first adder 806a is connected to the second sinc filter, the ninth memory element, and the second shifter 402b, 804a, and 802b for receiving the third sinc output signal (also referred to as "sinc signal_3"), the ninth delay output signal, and the second shifter output signal, respectively, and generates the twenty-first adder output signal. The third IIR filter 410b is functionally and structurally similar to the second IIR filter 410a. The order of the second IIR filter 410a may be changed by addition or removal of one or more of the memory elements 804.

Figure 8B:
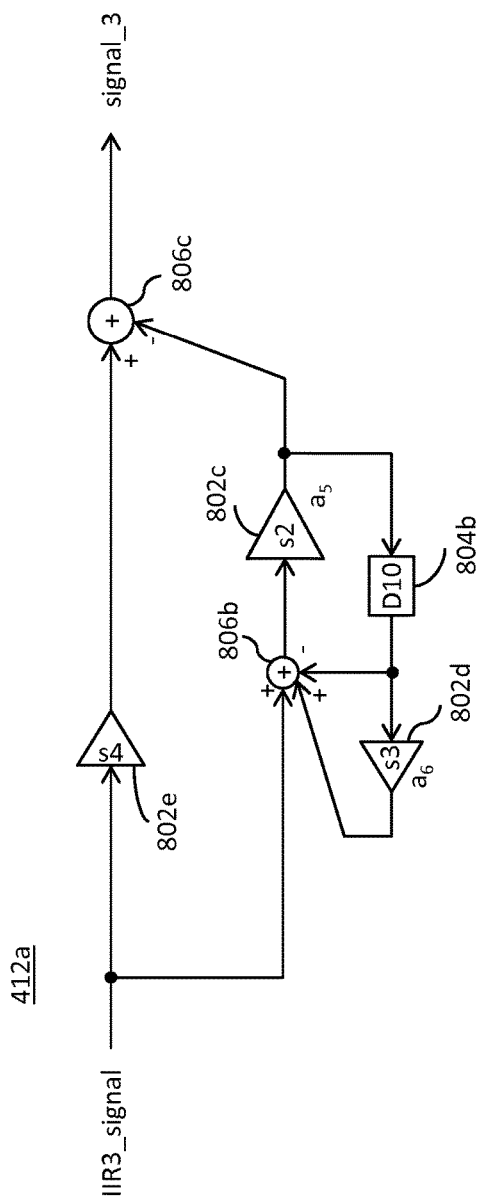

Referring now to FIG. 8B, a schematic block diagram of the second HPF 412a in accordance with an embodiment of the present invention is shown. The second HPF 412a includes third through fifth shifters 802c-802e, a tenth memory element 804b, and twenty-second and twenty-third adders 806b and 806c. In an example, the third, fourth, and fifth shifters 802c, 802d, and 802e are 8-16 bit shifters.

A transfer function of the second HPF 412a is given by equation (6) below:

$$E(z)=1-(a_5*(1/(1-z^{-1}+a_6*z^{-1}))) \quad (6)$$

where,

E(z)=the transfer function representing the second HPF 412a and $a_5$ and $a_6$=third and fourth shifter coefficients, respectively.

Binary values of the third and fourth shifter coefficients $a_5$ and $a_6$ are an integral power of two. Based on the binary values of the third and fourth shifter coefficients $a_5$ and $a_6$, the third and fourth shifters 802c and 802d multiply or divide third and fourth shifter input signals with the third and fourth shifter coefficients $a_5$ and $a_6$ by performing left or right shift operations on binary values of the third and fourth shifter input signals, respectively.

The third shifter 802c receives a twenty-second adder output signal (the third shifter input signal) and generates a third shifter output signal. The tenth memory element 804b is connected to the third shifter 802c for receiving the third shifter output signal and generates a tenth delay output signal (the fourth shifter input signal). The fourth shifter 802d is connected to the tenth memory element 804b for receiving the tenth delay output signal and generates the fourth shifter output signal. The twenty-second adder 806b is connected to the first shifter, the tenth memory element, and the fourth shifter 802a, 804b, and 802d for receiving the third filter, tenth delay, and fourth shifter output signals, respectively, and generates the twenty-second adder output signal.

The fifth shifter 802e is connected to the first shifter 802a for receiving the third filter output signal and generates a fifth shifter output signal. In an example, a binary value of the third filter output signal is 100 (3 bits) and a binary value of the fifth shifter output signal is 000100 (6 bits). Thus, the fifth shifter 802e increases a bit-length of the third filter output signal from 3 bits to a bit-length of 6 bits. The twenty-third adder 806c is connected to the third and fifth shifters 802c and 802e for receiving the third and fifth shifter output signals, respectively, and generates the third processed output signal. The order of the second HPF 412a may be changed by addition or removal of one or more of the memory element 804.

The system 200 and 300 multiplexes the first and second digital output signals using the TDM circuit 206. The second processor 212 is implemented using the shifters 802 as compared to multipliers and intermediate registers. Thus, implementing the systems 200 and 300 requires less circuit area, thereby reducing chip cost.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A system for detecting a mismatch between first and second input signals, comprising:
    a first analog-to-digital converter (ADC) for receiving the first input signal and generating a first digital output signal;
    a second ADC for receiving the second input signal and generating a second digital output signal;
    a time-division multiplexing (TDM) circuit, connected to the first and second ADCs, for receiving and time-division multiplexing the first and second digital output signals, and outputting a TDM signal;
    a first processor connected to the TDM circuit for receiving the TDM signal and generating a first processed output signal;
    a time-division de-multiplexing (TDDM) circuit, connected to the first processor, for receiving and time-division de-multiplexing the first processed output signal, and outputting first and second TDDM signals, respectively;
    a second processor connected to the first ADC for receiving the first digital output signal and generating a second processed output signal;
    a first gating circuit, connected to the TDDM circuit and the second processor, for receiving the first TDDM signal and the second processed output signal, respectively, comparing the first TDDM signal with the second processed output signal, and generating a first gating signal indicating a mismatch between the first TDDM signal and the second processed output signal;
    a third processor connected to the second ADC for receiving the second digital output signal and generating a third processed output signal,
    wherein the first processor comprises:
        a first sinc filter connected to the TDM circuit for receiving the TDM signal and generating a first sinc output signal;

a first trimmer connected to the first sinc filter for receiving the first sinc output signal and generating a first trim output signal;

a first infinite impulse response (IIR) filter connected to the first trimmer for receiving the first trim output signal and generating a first filter output signal; and a first high pass filter (HPF) connected to the first IIR filter for receiving the first filter output signal and generating the first processed output signal, wherein the second processor comprises:
a second sinc filter connected to the first ADC for receiving the first digital output signal and generating a second sinc output signal;
a second IIR filter connected to the second sinc filter for receiving the second sinc output signal and generating a second filter output signal; and
a second HPF connected to the second IIR filter for receiving the second filter output signal and generating the second processed output signal, wherein the third processor comprises:
a third sinc filter connected to the second ADC for receiving the second digital output signal and generating a third sinc output signal;
a third IIR filter connected to the third sinc filter for receiving the third sinc output signal and generating a third filter output signal; and
a third HPF connected to the third IIR filter for receiving the third filter output signal and generating the third processed output signal, and wherein the gating circuit comprises a first comparison circuit, connected to the TDDM circuit and the second HPF, for receiving and comparing the first TDDM signal and the second processed output signal; and
a second gating circuit connected to the TDDM circuit and the third HPF for receiving and comparing the second TDDM signal and the third processed output signal, and generating a second gating signal, and wherein bandwidths of the second and third IIR filters are greater than a bandwidth of the first IIR filter, and bandwidths of the second and third HPFs are greater than a bandwidth of the first HPF.

2. The system of claim 1, wherein a transfer function of the first IIR filter comprises floating-point coefficients and transfer functions of the second and third IIR filters comprise coefficients that are an integral power of two.

3. The system of claim 2, wherein a transfer function of the first HPF comprises floating-point coefficients and transfer functions of the second and third HPFs comprise coefficients that are an integral power of two.

4. An event detection system, comprising:
first and second sensors for detecting acceleration of a body and generating first and second output signals;
a first analog-to-digital converter (ADC) connected to the first sensor for receiving the first output signal and generating a first digital output signal;
a second ADC connected to the second sensor for receiving the second output signal and generating a second digital output signal;
a time-division multiplexing (TDM) circuit connected to the first and second ADCs for receiving and time-division multiplexing the first and second digital output signals, and outputting a TDM signal;
a first processor connected to the TDM circuit for receiving the TDM signal and generating a first processed output signal;
a time-division de-multiplexing (TDDM) circuit connected to the first processor for receiving and time-division de-multiplexing the first processed output signal, and outputting first and second TDDM signals;

a second processor connected to the first ADC for receiving the first digital output signal and generating a second processed output signal;

a first gating circuit, connected to the TDDM circuit and the second processor, for receiving and comparing the first TDDM signal and the second processed output signal, and generating a first gating signal;

a third processor connected to the second ADC for receiving the second digital output signal and generating a third processed output signal, wherein the first processor comprises:
a first sinc filter connected to the TDM circuit for receiving the TDM signal and generating a first sinc output signal;
a first trimmer connected to the first sinc filter for receiving the first sinc output signal and generating a first trim output signal;
a first infinite impulse response (IIR) filter connected to the first trimmer for receiving the first trim output signal and generating a first filter output signal; and
a first high pass filter (HPF) connected to the first IIR filter for receiving the first filter output signal and generating the first processed output signal, wherein the second processor comprises:
a second sinc filter connected to the first ADC for receiving the first digital output signal and generating a second sinc output signal;
a second IIR filter connected to the second sinc filter for receiving the second sinc output signal and generating a second filter output signal; and
a second HPF connected to the second IIR filter for receiving the second filter output signal and generating the second processed output signal, wherein the third processor comprises:
a third sinc filter connected to the second ADC for receiving the second digital output signal and generating a third sinc output signal;
a third IIR filter connected to the third sinc filter for receiving the third sinc output signal and generating a third filter output signal; and
a third HPF connected to the third IIR filter for receiving the third filter output signal and generating the third processed output signal, wherein bandwidths of the second and third IIR filters are greater than a bandwidth of the first IIR filter, and bandwidths of the second and third HPFs are greater than a bandwidth of the first HPF, a second gating circuit, connected to the TDDM circuit and the third HPF, for receiving and comparing the second TDDM signal and the third processed output signal, and generating a second gating signal; and an engine control unit (ECU) connected to the first gating circuit for receiving the first gating signal, and to the second gating circuit for receiving the second gating signal and executing pre-stored event detection algorithms using the first gating signal and the second gating signal, wherein the pre-stored event detection algorithms determine whether a trigger signal is generated.

5. The event detection system of claim 4, wherein a transfer function of the first IIR filter comprises floating-point coefficients, and transfer functions of the second and third IIR filters comprise coefficients that are an integral power of two.

6. The event detection system of claim 5, wherein a transfer function of the first HPF comprises floating-point coefficients, and transfer functions of the second and third HPFs comprise coefficients that are an integral power of two.

* * * * *